United States Patent
Li et al.

(10) Patent No.: US 6,317,662 B1
(45) Date of Patent: Nov. 13, 2001

(54) STABLE AND VERIFIABLE STATE ESTIMATION METHODS AND SYSTEMS WITH SPACECRAFT APPLICATIONS

(75) Inventors: Rongsheng Li, Hacienda Heights; Yeong-Wei Andy Wu, Rancho Palos Verdes, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/624,270

(22) Filed: Jul. 24, 2000

(51) Int. Cl.$^7$ .................................................. G06F 17/00
(52) U.S. Cl. ............................. 701/13; 701/31; 702/180; 702/196; 706/54; 706/61; 395/22; 395/500.11
(58) Field of Search ........................ 701/13, 31; 702/180, 702/189, 109, 191, 196; 706/54, 61; 364/528.11, 554, 148.1; 395/500.23; 703/2

(56) References Cited

U.S. PATENT DOCUMENTS

| | | | |
|---|---|---|---|
| 5,465,321 | * 11/1995 | Smyth | 395/22 |
| 5,506,794 | 4/1996 | Lange | 364/571.01 |
| 5,918,200 | * 6/1999 | Tsutsui et al. | 702/180 |
| 5,991,525 | * 11/1999 | Shah et al. | 395/500.23 |

OTHER PUBLICATIONS

Kaplan, Elliot D., *Understandning GPS*, Artech House, Norwood, Massachusetts, 1996, pp. 391–395.
Brookner, Eli, *Tracking and Kalman Filtering Made Easy*, John Wiley and Sons, New York, 1998, pp. 69–74.

* cited by examiner

Primary Examiner—William A. Cuchlinski, Jr.
Assistant Examiner—Arthur D. Donnelly
(74) Attorney, Agent, or Firm—T. Guamestad

(57) ABSTRACT

The stability of a recursive estimator process (e.g., a Kalman filter is assured for long time periods by periodically resetting an error covariance $P(t_n)$ of the system to a predetermined reset value $P_r$. The recursive process is thus repetitively forced to start from a selected covariance and continue for a time period that is short compared to the system's total operational time period. The time period in which the process must maintain its numerical stability is significantly reduced as is the demand on the system's numerical stability. The process stability for an extended operational time period $T_o$ is verified by performing the resetting step at the end of at least one reset time period $T_r$ whose duration is less than the operational time period $T_o$ and then confirming stability of the process over the reset time period $T_r$. Because the recursive process starts from a selected covariance at the beginning of each reset time period $T_r$, confirming stability of the process over at least one reset time period substantially confirms stability over the longer operational time period $T_o$.

30 Claims, 6 Drawing Sheets

US 6,317,662 B1

STABLE AND VERIFIABLE STATE ESTIMATION METHODS AND SYSTEMS WITH SPACECRAFT APPLICATIONS

GOVERNMENT RIGHTS

The invention described herein was made in the perfomance of work under NASA contract number NAS5-98069 and is subject to the provisions of Section 305 of the National Aeronautics and Space Act of 1958 (72 Stat. 435; 42 USC 2457).

BACKGROUND OF THE INVENTION

1. Field of the Invention

The present invention relates generally to state estimation processes and, more particularly, to spacecraft subsystems which use such processes.

2. Description of the Related Art

Kalman filtering is an estimation technique that combines a knowledge of the statistical nature of a system's measurement errors with a knowledge of the system's dynamics (as represented, for example, in a state space model) to arrive at an estimate of the system's state. In particular, a Kalman filter combines a current measurement $y(t_n)$ of a system state parameter $x(t_n)$ with measurement and state predictions $y^*(t_n^-)$ and $x^*(t_n^-)$ of the parameter $x(t_n)$ that are based on past measurements to thereby provide a filtered estimate $x^*(t_n^+)$ of the parameter $x(t_n)$. As indicated by the time term $t_n$, the filter successively and recursively combines the measurements and predictions to obtain estimates with a reduced variance (wherein $t_n^-$ and $t_n^+$ refer respectively to times just before and after each time $t_n$).

In an exemplary spacecraft application, a Kalman filter processes attitude and inertial rate measurements to provide an attitude estimate. Although the filter is known to be an especially effective state estimator for these systems, the process tends to have numerical instabilities when it is implemented with digital processors and continued over extensive time periods. The instability has a source in the finite accuracy of digital processing and it represents a danger to long-term spacecraft missions that repeat the same operational mode for years (e.g., as in communication processes of geosynchronous spacecraft). In response to this danger, computationally expensive filter formulations (e.g., Joseph formulation and UDU factorization) have been used to increase numerical stability. These approaches, however, increase the use of processing time which is a limited and tightly budgeted spacecraft resource.

In addition, these stability solutions have a further problem. Because of the high cost of spacecraft missions and the critical nature of spacecraft attitude control systems, it is especially desirable to verify the stability of all such processes over time periods that correspond to those in which the mission will be operational. When these operational time periods are measured in years, such testing is not feasible and, thus, these solutions are not verifiable.

SUMMARY OF THE INVENTION

The present invention is directed to computationally simple methods for enhancing and verifying the long-term stability of a recursive process that generates estimates of a system's state. The stability is enhanced by periodically resetting an error covariance $P(t_n)$ of the system to a reset value $P_r$ that exceeds the operational values $P_o$ of the process. The recursive process is thus repetitively forced to start from a selected covariance and continue for a time period that is short compared to the system's total operational time period. Because the time period over which the process must maintain its numerical stability is significantly reduced, the demand on its inherent stability is also significantly reduced.

The stability for an extended operational time period $T_o$ is verified by performing the resetting step at the end of at least one reset time period $T_r$ whose duration is less than the operational time period $T_o$ and then confirming stability of the process over the reset time period $T_r$. Because the process starts from a selected covariance at the beginning of each reset time period $T_r$, confirming stability of the process over at least one reset time period substantially confirms stability over the longer operational time period $T_o$.

Spacecraft system embodiments of the invention are also provided.

The novel features of the invention are set forth with particularity in the appended claims. The invention will be best understood from the following description when read in conjunction with the accompanying drawings.

DETAILED DESCRIPTION OF THE PREFERRED EMBODIMENTS

The present invention is directed to methods and structures that enhance and verify the long-term stability of recursive estimator processes, e,g., Kalman filter processes. In particular, the flow chart 20 of FIG. 1A recites process steps 22–26 of a method embodiment that enhances the long-term stability and the flow chart 30 of FIG. 1B recites process steps 22–25, and 32–34 of a method embodiment that verifies the long-term stability. Because these flow charts contain references to recursive process terminology, however, it will facilitate the description and understanding of their methods to precede that description with the following review of Kalman filter processes.

Figure 2:
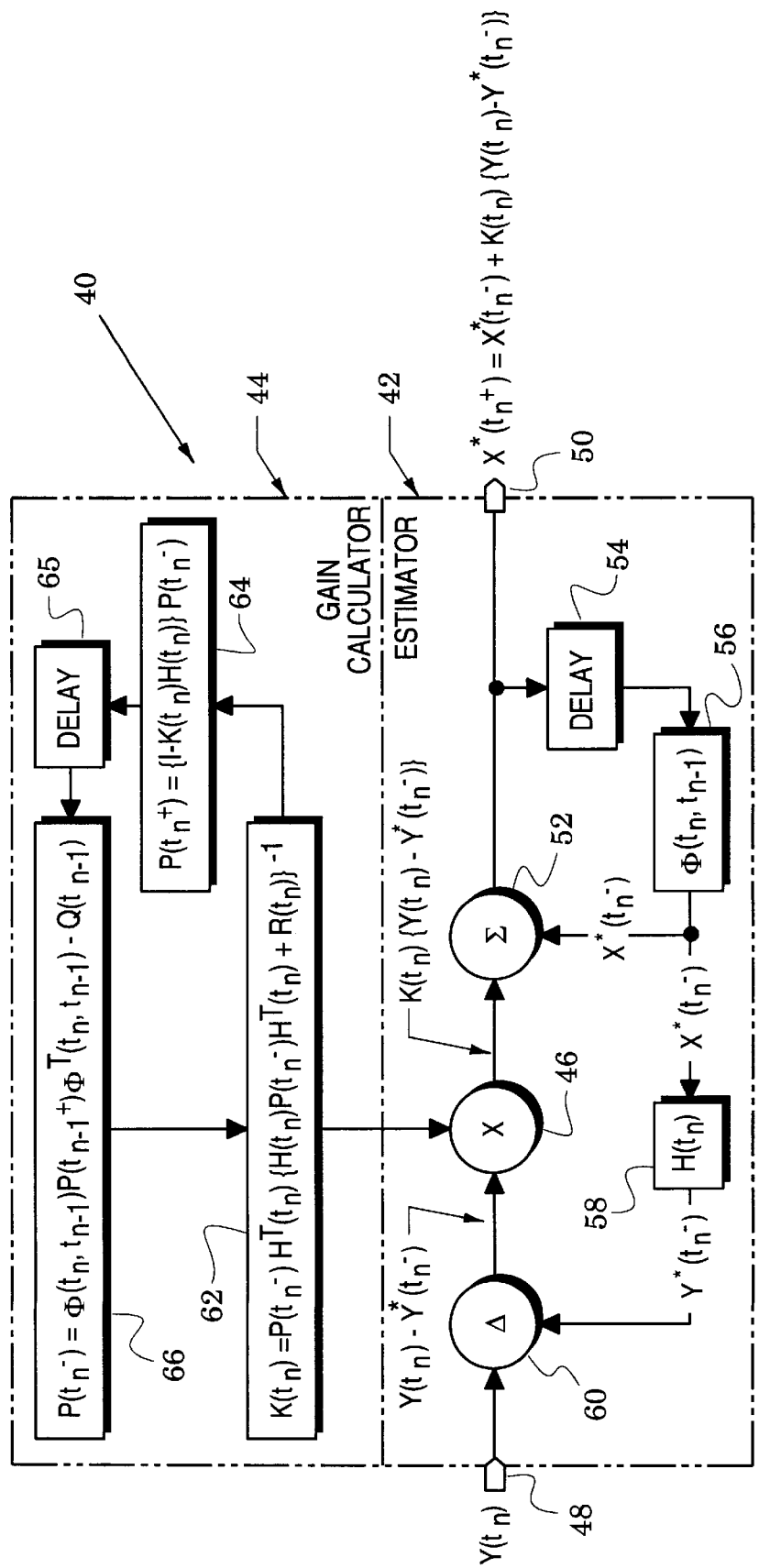
FIG. 2 is block diagram that shows an exemplary recursive estimator process.

FIG. 2 illustrates a process 40 that is based on an estimate update equation $$x^*(t_n^+) = x^*(t_n^-) + k(t_n)\{y(t_n) - y^*(t_n^-)\}, \qquad (1)$$

in which a state prediction $x^*(t_n^-)$ is updated by a portion $k(t_n)$ of a residue which is the difference between a measurement $y(t_n)$ and a measurement prediction $y^*(t_n^-)$ to thereby form an estimate $x^*(t_n^+)$. The portion $k(t_n)$ is typically referred to as the Kalman gain and is calculated as $$k(t_n) = \frac{\sigma_{\hat{x}}^2(t_n^-)}{\sigma_{\hat{x}}^2(t_n^-) + \sigma_m^2} \quad (2)$$

in which $\sigma_{x^*}^2(t_n^-)$ is the estimate variance (i.e., uncertainty of the estimate) and $\sigma_m^2$ is the measurement variance (i.e., uncertainty of the measurement).

As the process is recursively continued, the estimate variance is reduced below the measurement variance so that the gain $k(t_n)$ declines to a value much less than one. It is apparent from equation (1), therefore, that a large portion of the residue $\{y(t_n)-y^*(t_n^-)\}$ is initially used to update the state prediction $x^*(t_n^-)$ into the updated estimate $x^*(t_n^+)$ but this portion decreases as the process continues (i.e., the weighting given to new measurements is successively reduced). In particular, the estimate variance is reduced at each measurement $y(t_n)$ in accordance with $$\sigma_{x^*}^2(t_n^+) = (1 - k(t_n))\sigma_{x^*}^2(t_n^-). \quad (3)$$

These processes are expressed in a more general matrix form in FIG. 2 where they are partitioned into an estimator 42 and a gain calculator 44 that supplies a gain $K(t_n)$ to a multiplier 46 of the estimator. The estimator 42 receives a measurement $Y(t_n)$ at an input port 48 and provides an estimate $X^*(t_n^+)$ for a time just after the measurement to an output port 50. From this estimate matrix, a state prediction $X^*(t_n^-)$ is formed for a time just before the next measurement and this state prediction is provided to a summer 52.

Because the state of the system typically varies dynamically between measurements, the estimate $X^*(t_n^+)$ must be extrapolated over time to form the state prediction $X^*(t_{n-})$. This extrapolation is accomplished by passing the estimate $X^*(t_n^+)$ through a delay 54 and multiplying it by a state transition 56 which contains extrapolation information in the form of a state transition $\Phi(t_n,t_{n-1})$. The state prediction $X^*(t_n^-)$ is also multiplied by a measurement converter 58 to form a measurement prediction $Y^*(t_n^-)$ which is provided to a differencer 60 where it is differenced with the measurement $Y(t_n)$. The measurement converter $H(t_n)$ conditions the state prediction $X^*(t_n^-)$ so that its elements correspond to those of the measurement $Y(t_n)$ and can be properly differenced with it.

The differencer 60, therefore, generates a residue $Y(t_n)-H(t_n)Y^*(t_n^-)$ which is then multiplied in the multiplier 46 to form a correction $K(t_n)\{Y(t_n)-H(t_n)Y(t_n^-)\}$ that will be used to update the estimate. The updating is performed in the summer 52 where the correction is summed with the state prediction $X^*(t_n^-)$ to generate the updated estimate $$X^*(t_n^+)=X^*(t_n^-)+K(t_n)\{Y(t_n)-H(t_n)Y^*(t_n^-)\} \quad (4)$$

at the output port 50.

The gain calculator 44 performs similar updating and extrapolation processes for the gain $K(t_n)$. The estimate variance $\sigma_x^{*2}(t_n^-)$ and the measurement variance $\sigma_m^2$ of equation (2) are respectively replaced by an error covariance $P(t_n)$ and a measurement-noise covariance $R(t_n)$ which are measures of estimate error and of measurement error. In particular, the error covariance $P(t_n)$ is defined as $$P(t_n)=E\{(X(t_n)-X^*(t_n))(X(t_n)-X^*(t_n))^T\} \quad (5)$$

in which E is expectation and T is the transpose operation. If the difference between a state parameter and its estimate is referred to as estimation error and shortened to err, then equation (5) becomes $$P(t_n)=E\{(err\,X)(err\,X)^T\}. \quad (6)$$

When these replacements are made in equation (2), the calculation of gain becomes $$K(t_n)=P(t_n^-)H^T(t_n)\{H(t_n)P(t_n^-)H^T(t_n)+R(t_n)\}^- \quad (7)$$

in which the the error covariance $P(t_n)$ is appropriately modified by the measurement converter $H(t_n)$ and its transform $H^T(t_n)$. The extrapolation process of equation (7) is performed by the gain calculation block 62.

The error covariance $P(t_n)$ is updated between measurements in an update block 64 wherein the estimate variance $\sigma_x^{*2}(t_n^-)$ of equation (3) has been replaced by the error covariance $P(t_n)$ as modified by the measurement converter $H(t_n)$. Accordingly, the updated error covariance $P(t_n)$ is processed as $$P(t_n)=\{I-K(t_n)H(t_n)\}P(t_n^-) \quad (8)$$

The updated error covariance is then passed through delay 65 and extrapolated over time to form an error covariance $P(t_n^-)$. As shown in extrapolation block 66, this extrapolation is processed as $$P(t_n^-)=\Phi(t_n,t_{n-1})P(t_n^+)\Phi^T(t_n,t_{n-1})+Q(t_{n-1}) \quad (9)$$

and is effected with the state transition $\Phi(t_n,t_{n-1})$ and its transform. In addition, plant or process noise, which includes modeling errors as well as actual noise and system disturbances, is summarized in a process-noise covariance $Q(t_{n-1})$.

In summary, the gain calculator 44 updates the error covariance $P(t_n)$ in update block 64, delays it in delay 65 and extrapolates it in extrapolation block 66 to generate the error covariance $P(t_n^-)$. The updated, delayed and extrapolated error covariance in extrapolation block 66 is then combined with the measurement-noise covariance $R(t_n)$ in the gain calculation block 62 to calculate a gain $K(t_n)$ which is provided to the estimator 22 for processing the current measurement $Y(t_n)$ at the input port 28 into an updated estimate $X^*(t_n^+)$ at the output port 50. The update block 64 indicates that the error covariance $P(t_n)$ will reduce over time to steady state operational values $P_o$.

Figure 1A:
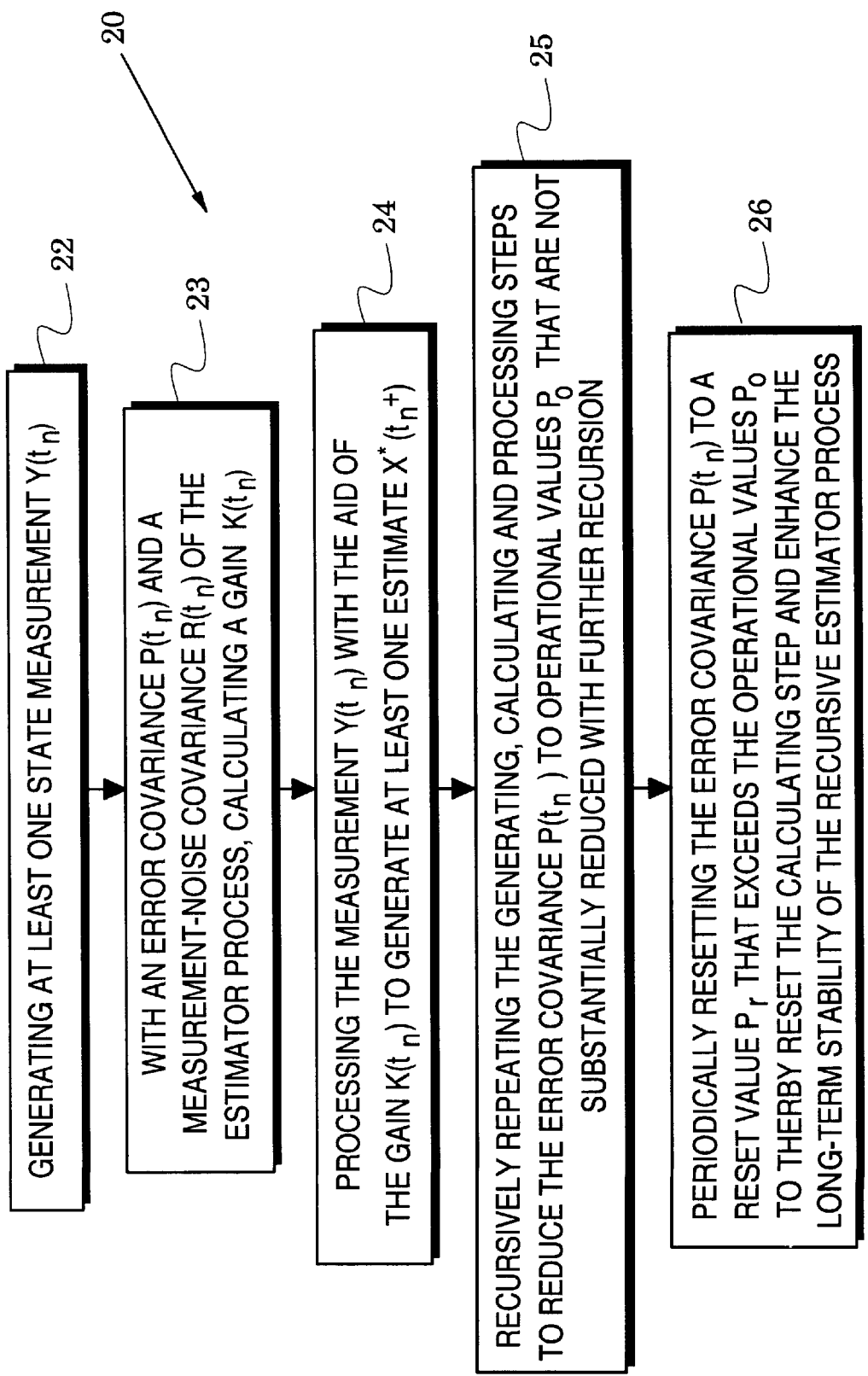
FIGS. 1A and 1B are flow charts that illustrate method embodiments of the present invention for respectively enhancing and verifying the long-term stability of a recursive estimator process.

Having reviewed the background recursive filtering terminology, attention is now redirected to the flow chart 20 of FIG. 1A which illustrates a method of enhancing the stability of a recursive estimator process. In particular, of a process that generates estimates $X^*(t_n^+)$ of state parameters $X(t_n)$ of a system from state measurements $Y(t_n)$ (wherein $t_n$ represents successive times and $t_n^+$ represents times that each lag a respective one of the successive times $t_n$).

A first process step 22 of the method generates at least one system state measurement $Y(t_n)$. With an error covariance $P(t_n)$ and a measurement-noise covariance $R(t_n)$ of the system, process step 23 calculates a gain $K(t_n)$. In process step 24, the measurement $Y(t_n)$ is then processed with the aid of the gain $K(t_n)$ to generate at least one estimate $X^*(t_n^+)$.

Process step 25 recursively repeats the generating, calculating and processing steps (steps 22–24) to reduce the error covariance $P(t_n)$ to operational values $P_o$ that are not substantially reduced with further recursion. Finally, process step 26 periodically resets the error covariance $P(t_n)$ to a reset value $P_r$ that exceeds the operational values $P_o$ to thereby reset the calculating step (step 23) and enhance the stability of the recursive estimator process.

Figure 3:
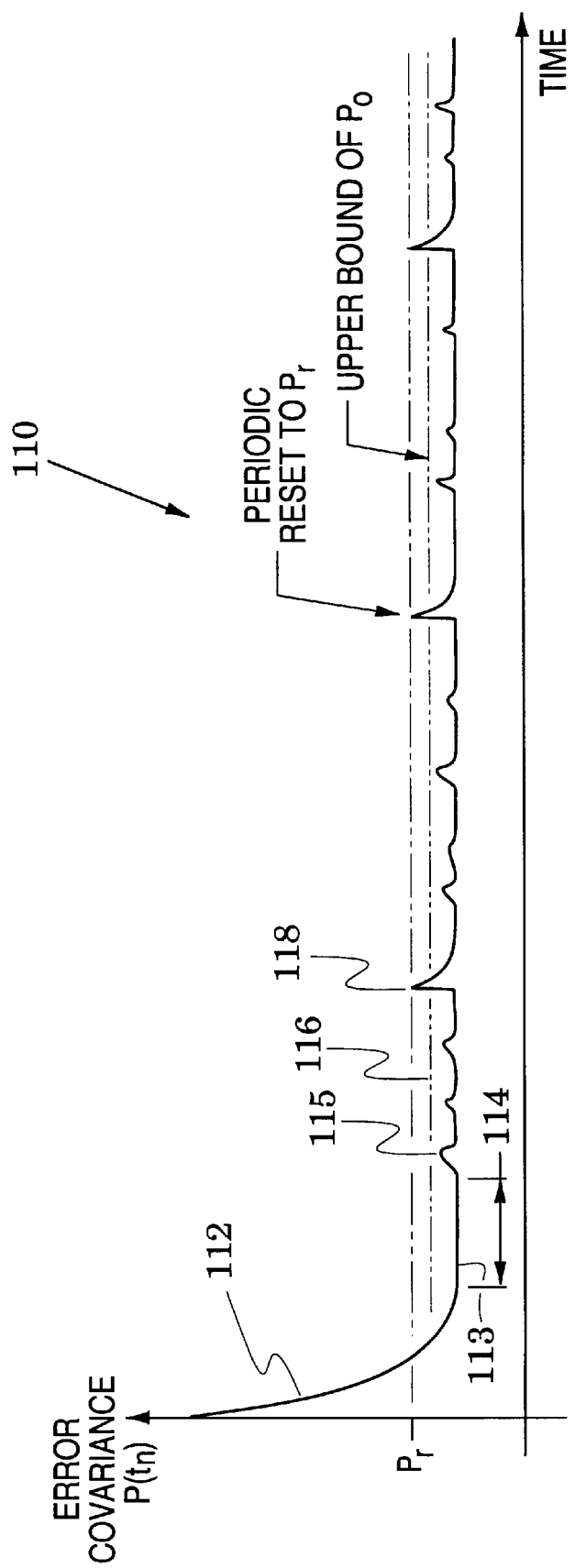
FIG. 3 is a diagram that illustrates the methods of FIGS. 1A and 1B as they relate to an error covariance of the recursive estimator process.

An understanding of the processes of FIG. 1A is enhanced with reference to diagram 110 of FIG. 3 which shows an exemplary plot 112 of the error covariance $P(t_n)$ as a function of time. The plot 112 illustrates changes imposed upon the error covariance $P(t_n)$ by the processes of FIG. 1A.

In accordance with process step 25 of FIG. 1A, the plot 112 shows that the error covariance $P(t_n)$ is recursively reduced to an operational value 113 that is not substantially reduced with further recursion. As a result of the recursive estimator process, the error covariance $P(t_n)$ initially falls at a rapid rate but that rate declines until the error covariance $P(t_n)$ reaches the operational value 113 after which, it is not substantially reduced with further recursion that progresses along the time axis (e.g., in the time zone 114).

The operational value 113 represents a steady state value for the the error covariance $P(t_n)$ in the absence of state perturbations. This steady state, however, is interrupted by perturbation inputs that change the state of the system that is associated with the processes of FIG. 1A. If the system is an attitude control system on a spacecraft, exemplary perturbation inputs are torques applied to the spacecraft's body (e.g., via momentum wheels, thrusters or the movement of solar wings).

The perturbation inputs cause the error covariance $P(t_n)$ to temporarily increase to greater perturbation values (as exemplified by the perturbation value 115) before the process step 25 of FIG. 1A returns it to the steady state operational value 113. Although the specific magnitudes of the perturbation values are functions of the respective system that is associated with the processes of FIG. 1A, they will have an an upper bound 116. Therefore, the error covariance will have an upperound value $P_{ub}$ at the upper bound 116.

In accordance with process step 26 of FIG. 1A, the error covariance $P(t_n)$ is periodically reset to a reset value $P_r$ that exceeds the operational values. This is exemplified in FIG. 3 by the reset 118 to a reset value $P_r$ which exceeds the steady state value 113 and, preferably, exceeds the upper bound 116. After the reset 118, the recursive process again returns the error covariance to the steady state value 113.

The relationship between the reset value and the upper-bound value $P_{ub}$ may be mathematically expressed as $P_r = (1+\alpha)P_{ub}$ wherein $\alpha$ is a positive number (in applications in which the error covariance is represented as a matrix, the reset value is formed as the sum of the error covariance matrix and a diagonal matrix). Although $\alpha$ is also a function of the respective system that is associated with the processes of FIG. 1A, simulations indicate that it will generally have a value less than 0.1 in spacecraft attitude control applications.

The method 20 of FIG. 1A thus periodically resets the error covariance $P(t_n)$ so that the recursive estimator process is repetitively forced to start from a selected error covariance reset value $P_r$. After each reset, the process continues for a time period that is short compared to its total operational time period. Because the time period in which the process is required to maintain its numerical stability is therefore significantly reduced, the demand on its numerical stability is also significantly reduced. The method thus not only enhances stability but also facilitates the use of less computationally expensive algorithms.

The teachings of the invention also facilitate the verification of process stability. This is exemplified by the method 30 of FIG. 1B which is directed to verification of the stability of a recursive estimator process that must maintain stability for an operational time period $T_o$.

This method begins with the process steps 22–25 of FIG. 1A. The last of these steps processes the measurement $Y(t_n)$ with the aid of the gain $K(t_n)$ to thereby generate at least one estimate $X^*(t_n^+)$ and reduce the error covariance $P(t_n)$ to operational values $P_o$ that that are not substantially reduced with further recursion. Process step 32 then continues the repeating step (process step 25) for at least one reset time period $T_r$ whose duration is less than that of the operational time period $T_o$.

At the end of each reset time period $T_r$, the error covariance $P(t_n)$ is reset in process step 33 to a reset value $P_r$ that exceeds the operational values $P_o$ to thereby reset the calculating step of process step 24. Finally, step 34 confirms the stability of the recursive estimator process over at least one reset time period $T_r$.

In the method 30, the error covariance is reset after each reset time period $T_r$. Because the recursive process is therefore forced to start from the same covariance after each reset time period $T_r$, confirming stability of the process over at least one reset time period substantially confirms stability over the greater operational time period $T_o$.

Figure 1B:
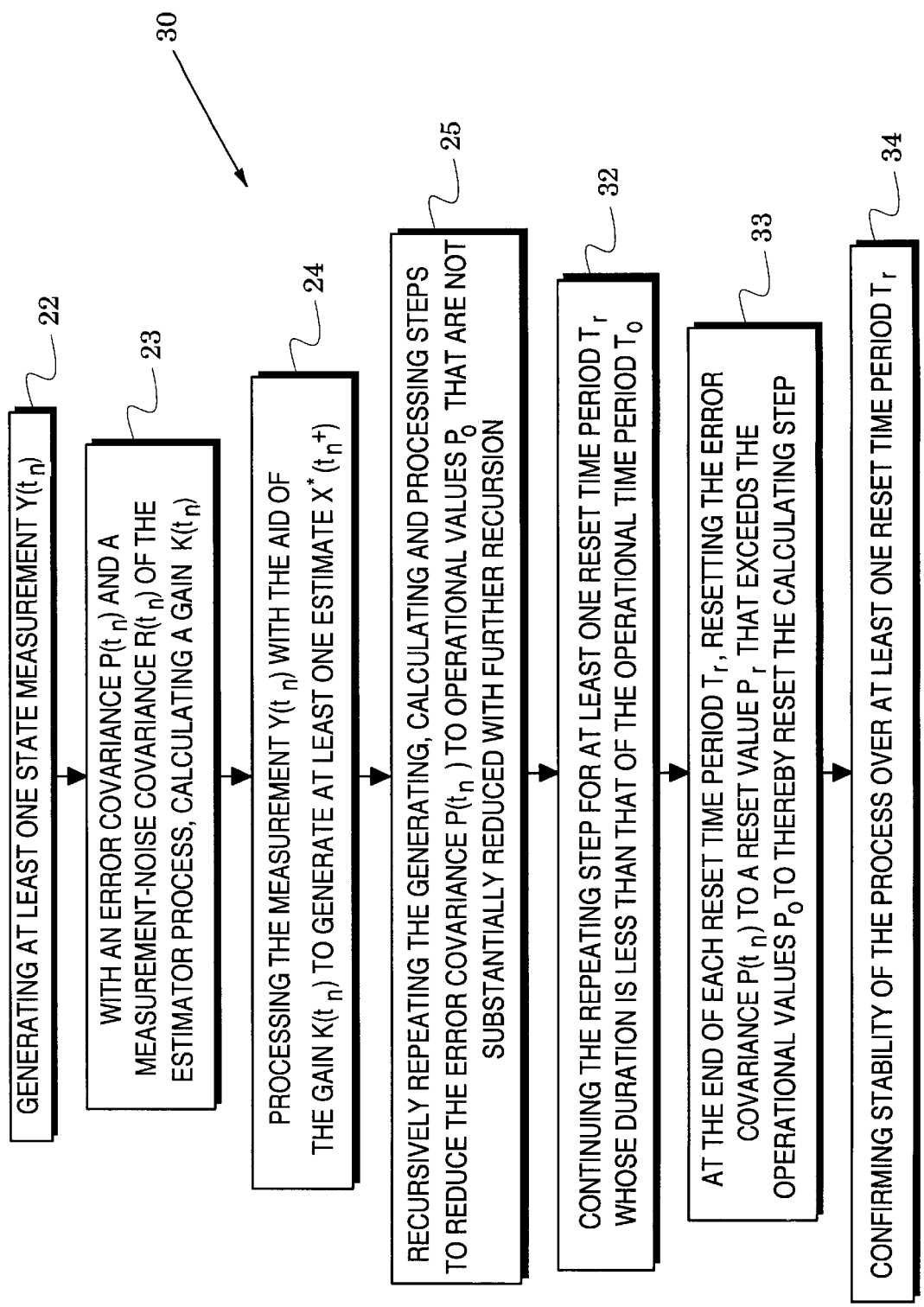

Because they periodically reset the error covariance to a predetermined reset value $P_r$, the methods 20 and 30 of FIGS. 1A and 1B inhibit numerical instabilities and thus maintain a stable recursive estimator process. In a process in which the error covariance is processed as a matrix, for example, the methods insure that the error covariance matrix will always be positive definite (a matrix is positive definite when for any nonzero vector Z with matching dimensions, the product $Z^T PZ$ is a positive scalar).

Figure 4:
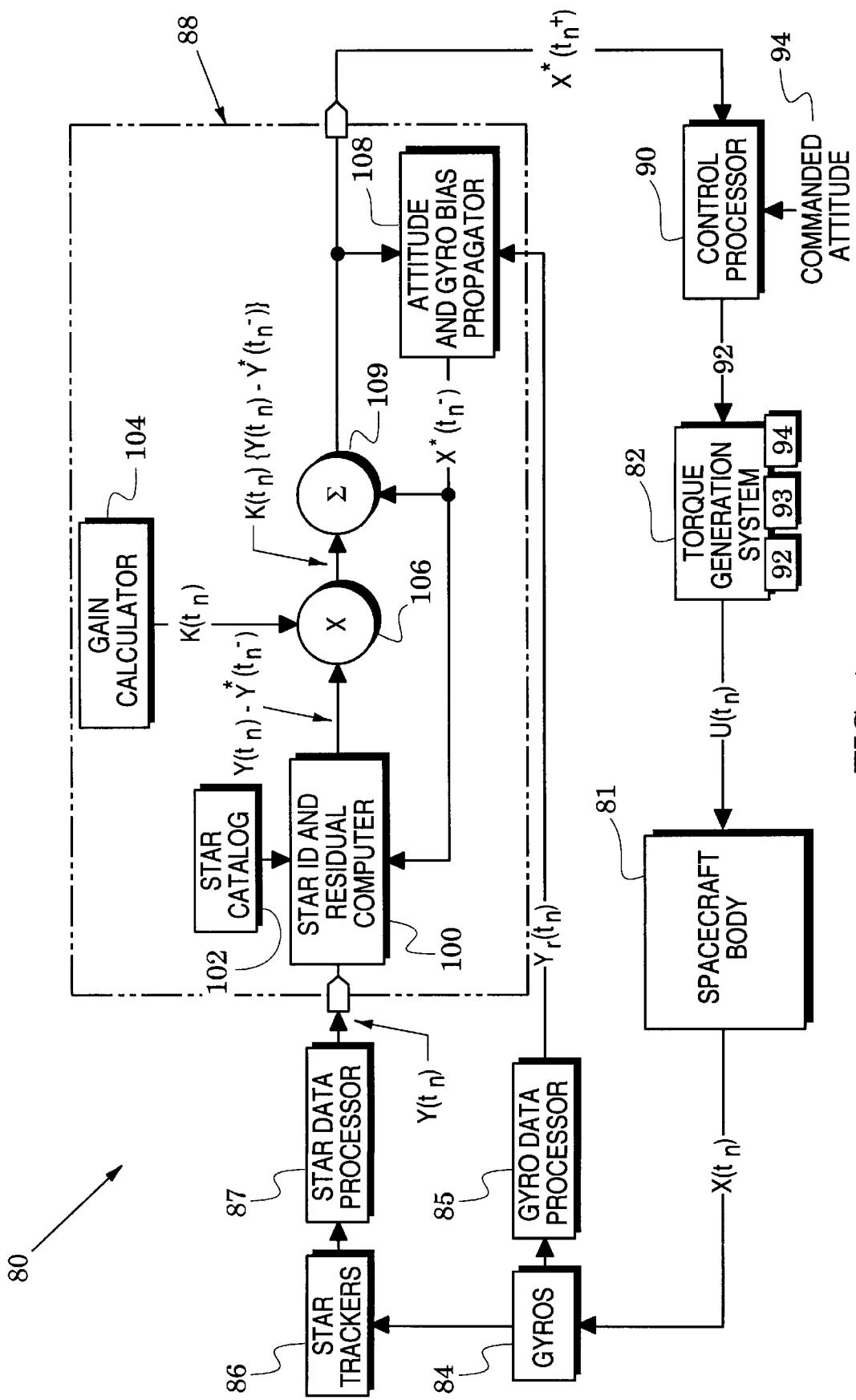
FIG. 4 is a block diagram of a spacecraft attitude control system for practicing the methods of FIGS. 1A and 1B.

Exemplary applications of the methods of FIGS. 1A and 1B are in spacecraft attitude control systems such as the system 80 of FIG. 4 which controls attitude of a spacecraft body 81. In this application, an exemplary operational time period $T_o$ is greater than one year and an exemplary reset time period $T_r$ in the verification process steps 32–34 of FIG. 1B is on the order of one day.

The system 80 includes a torque generation system 82, gyroscopes 84 and gyroscope data processor 85, star trackers 86 and star data processor 87, a filter processor 88 and an attitude control processor 90. The system 82 uses torque-generation elements (e.g., thrusters 92, momentum wheels 93 and/or magnetic torquers 94) to apply torque inputs $U(t_n)$ to the spacecraft body 82 that change its state $X(t_n)$ (e.g., its attitude and attitude rate).

The gyroscopes 84 and the star trackers 86 produce measurements $Y_r(t_n)$ and $Y(t_n)$ of the state $X(t_n)$ from which the filter processor 88 generates estimates $X^*(t_n)$. Finally, the attitude control processor 90 generates attitude control signals 92 in response to the attitude difference between the estimates $X^*(t_n)$ and a commanded attitude 94. The attitude control signals 92 are then applied to the torque generation system 82 to generate the torque inputs $U(t_n)$.

The filter processor 88 is preferably a digital processor that is programmed to perform the processes shown in FIG. 2 and the concepts illustrated in the flow charts of FIGS. 1A and 1B. In an exemplary processor, a star ID (identification) and residual computer 100 generates the residue $Y(t_n)-Y^*(t_n^-)$ in response to the estimate $Y(t_n)$ and inputs from a star catalog 102. A gain calculator 104 provides the gain $K(t_n)$ (in accordance with the processes of the gain calculator 44 of FIG. 2) which is multiplied in a multiplier 106 to produce the correction $K(t_n)\{Y(t_n)-Y^*(t_n^-)\}$.

An attitude and gyro bias propagator 108 uses the rate measurement $Y_r(t_n)$ to extrapolate the estimates $X^*(t_n)$ into the attitude prediction $X^*(t_n^-)$ (that corresponds to a successive measurement) which is summed in a summer 109 with the correction $K(t_n)\{Y(t_n)-Y^*(t_n^-)\}$ to generate the succeeding estimates $X^*(t_n)$. In the attitude control system 80, the resetting step 26 of FIG. 1A would be implemented in the gain calculator 104.

Figure 5:
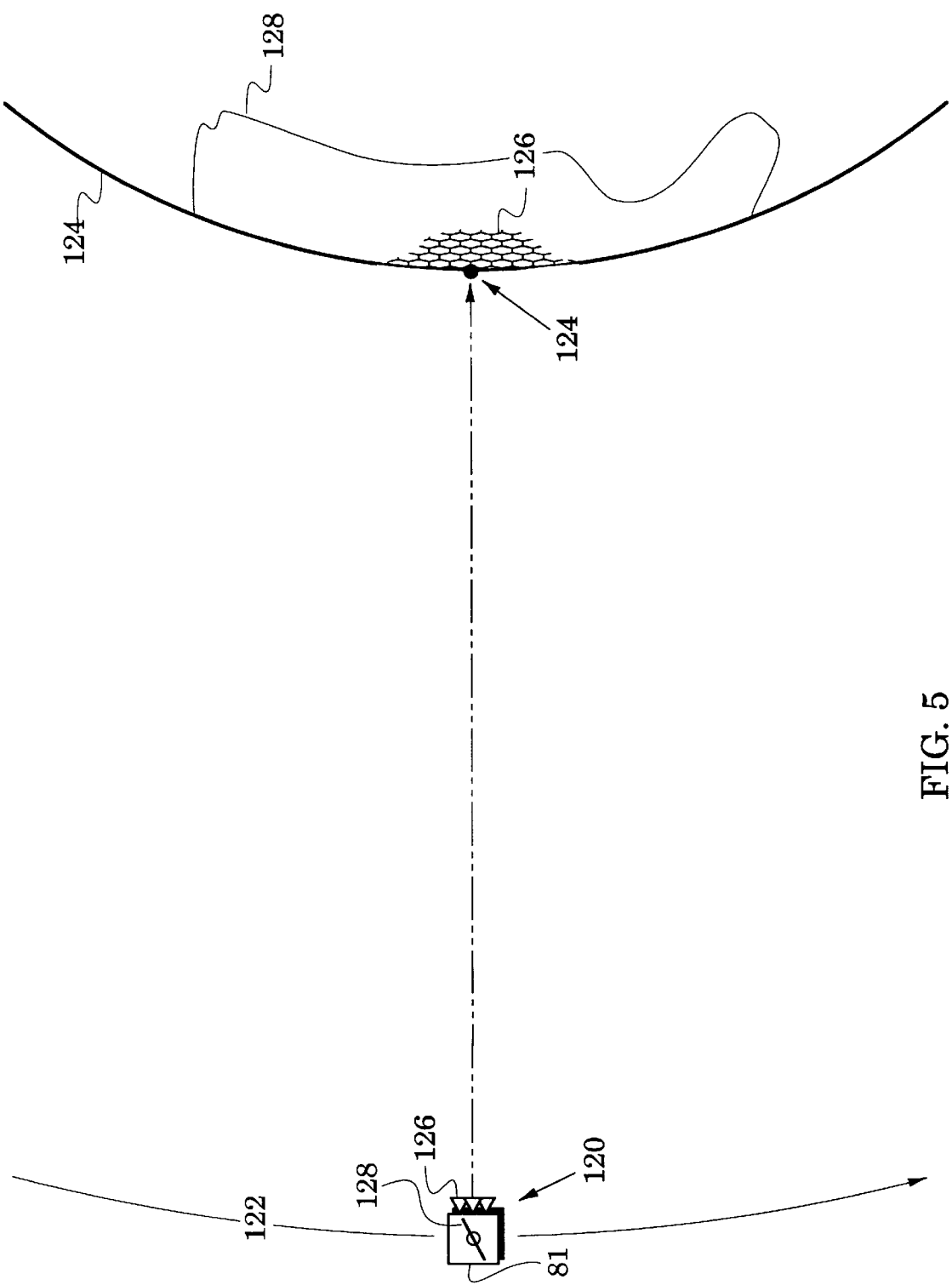
FIG. 5 is a diagram of a spacecraft that includes the attitude control system of FIG. 4.

FIG. 5 illustrates an exemplary spacecraft 120 that travels in an orbital path 122 about the earth 124. Carried in its body 81, the spacecraft has a communication system that incudes antennas 126 and a power generation system that includes solar panels 128. The attitude control system 80 of FIG. 4 is preferably included in the spacecraft's body 81 to control its attitude.

For example, the sattelite's attitude may be controlled to direct its antennas 122 at various targets (e.g., a sub-orbital point 124 or respective communication cells 126 in a terrestrial area 128). The methods of FIGS. 1A and 1B are implemented in the spacecraft's processors (e.g., the processor 88 of FIG. 4) to insure the long-term stability of the attitude control and to facilitate verification of that stability prior to the spacecraft's insertion into its orbital path 122.

Although they were described as having matrix form in the description of FIG. 2, estimator terms such as the gain $K(t_n)$ may, in general, be expressed in any form that facilitates their processing.

The methods of the invention were illustrated with reference to Kalman filtering processes but they may be practiced with any recursive estimator process.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of enhancing the stability of a recursive estimator process that generates estimates $X^*(t_n^+)$ of state parameters $X(t_n)$ of a system from measurements $Y(t_n)$ wherein $t_n$ represents successive times and $t_n^+$ represents times that each lag a respective one of said successive times $t_n$, said method comprising the steps of:

generating at least one measurement $Y(t_n)$;

with an error covariance $P(t_n)$ and a measurement-noise covariance $R(t_n)$ of said process, calculating a gain $K(t_n)$;

processing said measurement $Y(t_n)$ with the aid of said gain $K(t_n)$ to generate at least one estimate $X^*(t_n^+)$;

recursively repeating said generating, calculating and processing steps to reduce said error covariance $P(t_n)$ to operational values $P_o$ that are not substantially reduced with further recursion; and periodically resetting said error covariance $P(t_n)$ to a reset value $P_r$ that exceeds said operational values $P_o$ to thereby reset said calculating step and enhance said stability.

2. The method of claim 1, wherein said operational values $P_o$ have a steady state value and said reset value $P_r$ exceeds said steady state value.

3. The method of claim 1, wherein said operational values $P_o$ have an upper bound $P_{ub}$ and said reset value $P_r$ exceeds said upper bound $P_{ub}$.

4. The method of claim 3, wherein said resetting step includes the step of determining said reset value $P_r$ in accordance with $P_r=(1+\alpha)P_{ub}$ wherein $\alpha$ is a positive number greater than zero.

5. The method of claim 1, wherein said at least one measurement $Y(t_n)$ comprises a plurality of measurements $Y(t_n)$ that include a measurement of at least one of said state parameters $X(t_n)$.

6. The method of claim 1, wherein said processing step includes the steps of:

with a state transition $\Phi$ of said process, extrapolating a delayed version of an estimate $X^*(t_{n-1})$ into a state prediction $X^*(t_n^-)$ and a measurement prediction $Y^*(t_n^-)$;

differencing said measurement $Y(t_n)$ and said measurement prediction $Y^*(t_n^-)$ to form a residue $Y(t_n)-Y^*(t_n^-)$; and summing said state prediction $X^*(t_n^-)$ with a correction $K(t_n)\{Y(t_n)-Y^*(t_n^-)\}$ that is the product of said gain $K(t_n)$ and said residue $Y(t_n)-Y^*(t_n^-)$ to thereby generate said attitude estimate $X^*(t_n^+)$;

wherein $t_n^-$ represents times that each lead a respective one of said successive times $t_n$.

7. The method of claim 6, wherein said extrapolating step includes the step of multiplying said state prediction $X^*(t_n^-)$ by a measurement converter $H(t_n)$ of said process to realize said measurement prediction $Y^*(t_n^-)$.

8. The method of claim 6, further including the step of facilitating said calculating step with said measurement converter $H(t_n)$ and a process-noise covariance $Q(t_n)$ of said process.

9. The method of claim 1, wherein said system is an attitude-control system of a spacecraft and said measurement $Y(t_n)$ includes measurements of at least one of the attitude and attitude rate of said spacecraft.

10. A method of verifying the stability of a recursive estimator process for an operational time period $T_o$ of a system wherein said process generates estimates $X^*(t_n^+)$ of state parameters $X(t_n)$ of said system from measurements $Y(t_n)$ wherein $t_n$ represents successive times and $t_n^+$ represents times that each lag a respective one of said successive times $t_n$, said method comprising the steps of:

generating at least one measurement $Y(t_n)$;

with an error covariance $P(t_n)$ and a measurement-noise covariance $R(t_n)$ of said process, calculating a gain $K(t_n)$;

processing said measurement $Y(t_n)$ with the aid of said gain $K(t_n)$ to generate at least one estimate $X^*(t_n^+)$;

recursively repeating said generating, calculating and processing steps to reduce said error covariance $P(t_n)$ to operational values $P_o$ that are not substantially reduced with further recursion;

continuing said repeating step for at least one reset time period $T_r$ whose duration is less than that of said operational time period $T_o$;

at the end of each reset time period $T_r$, resetting said error covariance $P(t_n)$ to a reset value $P_r$ that exceeds said operational values $P_o$ to thereby reset said calculating step; and confirming stability of said process over at least one reset time period $T_r$;

said continuing, resetting and confirming steps thereby verifying stability over said operational time period $T_o$.

11. The method of claim 10, wherein said operational values $P_o$ have a steady state value and said reset value $P_r$ exceeds said steady state value.

12. The method of claim 10, wherein said operational values $P_o$ have an upper bound $P_{ub}$ and said reset value $P_r$ exceeds said upper bound $P_{ub}$.

13. The method of claim 12, wherein said resetting step includes the step of determining said reset value $P_r$ in accordance with $P_r=(1+\alpha)P_{ub}$ wherein $\alpha$ is a positive number greater than zero.

14. The method of claim 10, wherein said operational time period $T_o$ is greater than one year and said reset time period $T_r$ is on the order of one day.

15. The method of claim 10, wherein said system is an attitude-control system of a spacecraft and said measurement $Y(t_n)$ includes measurements of at least one of the attitude and attitude rate of said spacecraft.

16. The method of claim 10, wherein said processing step includes the steps of:
- with a state transition $\Phi$ of said process, extrapolating a delayed version of an estimate $X^*(t_{n-1})$ into a state prediction $X^*(t_n^-)$ and a measurement prediction $Y^*(t_n^-)$;
- differencing said measurement $Y(t_n)$ and said measurement prediction $Y^*(t_n^-)$ to form a residue $Y(t_n)-Y^*(t_n^-)$; and
- summing said state prediction $X^*(t_n^-)$ with a correction $K(t_n)\{Y(t_n)-Y^*(t_n^-)\}$ that is the product of said gain $K(t_n)$ and said residue $Y(t_n)-Y^*(t_n^-)$ to thereby generate said attitude estimate $X^*(t_n^+)$;
- wherein $t_n^-$ represents times that each lead a respective one of said successive times $t_n$.

17. The method of claim 16, wherein said extrapolating step includes the step of multiplying said state prediction $X^*(t_n^-)$ by a measurement converter $H(t_n)$ of said process to realize said measurement prediction $Y^*(t_n^-)$.

18. The method of claim 16, further including the step of facilitating said calculating step with said measurement converter $H(t_n)$ and a process-noise covariance $Q(t_n)$ of said process.

19. The method of claim 10, wherein said error covariance $P(t_n)$ is expressed as a matrix and said confirming step includes the step of verifying that said matrix remains a positive definite matrix.

20. The method of claim 10, wherein said system is an attitude-control system of a spacecraft and said at least one measurement $Y(t_n)$ includes measurements of the attitude and attitude rate of said spacecraft.

21. An attitude-controlled spacecraft, comprising:
- a spacecraft body;
- at least one star tracker that is coupled to said body for providing attitude signals;
- at least one gyroscope that is coupled to said body for providing attitude-rate signals;
- a data processor in said body that is programmed to perform a recursive estimator process that generates attitude estimates $X^*(t_n^+)$ from attitude measurements $Y(t_n)$ wherein $t_n$ represents successive times and $t_n^+$ represents times that each lag a respective one of said successive times $t_n$, said process including the steps of:
  a) generating at least one measurement $Y(t_n)$;
  b) with an error covariance $P(t_n)$ and a measurement-noise covariance $R(t_n)$ of said process, calculating a gain $K(t_n)$;
  c) processing said measurement $Y(t_n)$ with the aid of said gain $K(t_n)$ to generate at least one estimate $x^*(t_n^+)$;
  d) recursively repeating said generating, calculating and processing steps to reduce said error covariance $P(t_n)$ to operational values $P_o$ that are not substantially reduced with further recursion; and
  e) periodically resetting said error covariance $P(t_n)$ to a reset value $P_r$ that exceeds said operational values $P_o$ to thereby reset said calculating step;
- an attitude controller in said spacecraft that generates torque generation signals in response to an attitude difference between a commanded attitude and said attitude estimate $X^*(t_n^+)$; and p1 a torque generation system that is coupled to generate torques in said body in response to said torque generation signals to thereby reduce said attitude difference;
- said resetting step thereby resetting said calculating step and enhancing said stability.

22. The spacecraft of claim 21, wherein said operational values $P_o$ have a steady state value and said reset value $P_r$ exceeds said steady state value.

23. The method of claim 21, wherein said operational values $P_o$ have an upper bound $P_{ub}$ and said reset value $P_r$ exceeds said upper bound $P_{ub}$.

24. The spacecraft of claim 21, wherein said processing step includes the steps of:
- with a state transition $\Phi$ of said process, extrapolating a delayed version of an estimate $X^*(t_{n-1})$ into a state prediction $X^*(t_n)$ and a measurement prediction $Y^*(t_n^-)$;
- differencing said measurement $Y(t_n)$ and said measurement prediction $Y^*(t_n^-)$ to form a residue $Y(t_n)-Y^*(t_n^-)$; and
- summing said state prediction $X^*(t_n^-)$ with a correction $K(t_n)\{Y(t_n)-Y^*(t_n^-)\}$ that is the product of said gain $K(t_n)$ and said residue $Y(t_n)-Y^*(t_n^-)$ to thereby generate said attitude estimate $X^*(t_n^+)$;
- wherein $t_n^-$ represents times that each lead a respective one of said successive times $t_n$.

25. The spacecraft of claim 24, wherein said extrapolating step includes the step of multiplying said state prediction $X^*(t_n^-)$ by a measurement converter $H(t_n)$ of said process to realize said measurement prediction $Y^*(t_n^-)$.

26. The spacecraft of claim 24, further including the step of facilitating said calculating step with said measurement converter $H(t_n)$ and a process-noise covariance $Q(t_n)$ of said process.

27. The spacecraft of claim 21, wherein said at least one star tracker comprises three star trackers directed along three mutually-orthogonal axes of said spacecraft and said at least one gyroscope comprises three gyroscopes arranged to detect spacecraft rotation about said axes.

28. The spacecraft of claim 21, further including solar wings coupled to said body to generate power.

29. The spacecraft of claim 21, further including antennas coupled to said body to transmit and receive communication signals.

30. The spacecraft of claim 21, wherein said torque generation system includes thrusters coupled to said body.

* * * * *